(12) United States Patent
Seyedi-Esfahani

(10) Patent No.: US 8,369,449 B2
(45) Date of Patent: Feb. 5, 2013

(54) METHOD AND SYSTEM OF DIVERSITY TRANSMISSION OF DATA EMPLOYING M-POINT QAM MODULATION

(75) Inventor: Seyed-Alireza Seyedi-Esfahani, Fairport, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1295 days.

(21) Appl. No.: 12/067,337

(22) PCT Filed: Sep. 19, 2006

(86) PCT No.: PCT/IB2006/053377
§ 371 (c)(1), (2), (4) Date: Mar. 19, 2008

(87) PCT Pub. No.: WO2007/034415
PCT Pub. Date: Mar. 29, 2007

(65) Prior Publication Data
US 2008/0260068 A1    Oct. 23, 2008

Related U.S. Application Data

(60) Provisional application No. 60/718,924, filed on Sep. 20, 2005.

(51) Int. Cl.
*H04L 27/36* (2006.01)
*H04L 27/00* (2006.01)
*H03K 9/00* (2006.01)

(52) U.S. Cl. .......................... 375/298; 375/295; 375/316

(58) Field of Classification Search .................. 375/295, 375/298
See application file for complete search history.

(56) References Cited

U.S. PATENT DOCUMENTS

| 4,414,537 | A   |   | 11/1983 | Grimes  |         |
|-----------|-----|---|---------|---------|---------|
| 5,295,159 | A   | * | 3/1994  | Kerpez  | 375/260 |
| 5,448,592 | A   |   | 9/1995  | Williams|         |
| 6,369,797 | B1  |   | 4/2002  | Maynard |         |
| 6,614,861 | B1  |   | 9/2003  | Terry   |         |

(Continued)

FOREIGN PATENT DOCUMENTS

| JP | 04295323 A1 | 10/1992 |
|----|-------------|---------|
| JP | 09328783 A1 | 12/1997 |

(Continued)

OTHER PUBLICATIONS

K. Kerpez, "Constellations for good Diversity performance", IEEE Transactions on Communications, vol. 41, No. 9, Sep. 1993, pp. 1412-1421, XP002428828.

(Continued)

*Primary Examiner* — David C. Payne
*Assistant Examiner* — Brian J Stevens
(74) *Attorney, Agent, or Firm* — Larry Liberchuk

(57) ABSTRACT

A method (600) of communicating a plurality of data bits over L diversity channels uses a constellation set comprising a plurality (L) of M-point quadrature amplitude modulation (QAM) constellations corresponding to the L diversity channels. The constellations do not exhibit overlapping data points, and provide full diversity. The method includes mapping (650) k*L data bits to L QAM transmission symbols in the L QAM constellation sets, and transmitting (660) the L QAM symbols where $M=2^{k*L}$. Each of each of the k*L data bits is directly mapped into all of the L QAM symbols of the QAM constellation set, and for all combinations of k*L bits, changing a value of one of k*L data bits changes all of the L symbols.

19 Claims, 8 Drawing Sheets

U.S. PATENT DOCUMENTS

| | | | |
|---|---|---|---|
| 6,644,092 B1 | 11/2003 | Oppel | |
| 7,398,439 B2* | 7/2008 | Kushida et al. | 714/718 |
| 2002/0126648 A1 | 9/2002 | Kuchi | |
| 2003/0143962 A1 | 7/2003 | Boariu | |
| 2005/0190800 A1* | 9/2005 | Maltsev et al. | 370/914 |
| 2005/0287978 A1* | 12/2005 | Maltsev et al. | 455/403 |
| 2008/0049862 A1* | 2/2008 | Dean et al. | 375/267 |
| 2008/0063121 A1* | 3/2008 | Geller et al. | 375/345 |

FOREIGN PATENT DOCUMENTS

| | | |
|---|---|---|
| WO | WO02058311 A1 | 7/2002 |
| WO | WO 2007000180 A1 * | 1/2007 |

OTHER PUBLICATIONS

T. Sunaga et al., "Performance of Multi-Level QAM with Post-Detection Maximal Ratio Combining Space Diversity for Digital Land-Mobile Radio Communications", IEEE Conference Proceedings Article, XP010003610, Aug. 2003.

A. Stefanov et al., Turbo-Coded Modulation for Systems with Transmit and Receive Antenna Diversity over Block Fading Channels: System Model, Decoding Approaches, and Practical Considerations, IEEE, Dept of Electrical Engineering, XP010373371, May 2001.

A. Bury, "Diversity Comparison of Spreading Transforms for Multicarrier Spread Spectrum Transmission", IEEE, Multicarrier and Spread Spectrum Systems of the IEEE Communications Society, May 2003.

S. Kaiser, "OFDM Code-Division Multiplexing in Fading Channels", CDMA Systems of the IEEE Communications Soc., IEEE Global Telecommunications Conf, Brazil 1999, Texas 2001.

T. Sunaga et al., "Performance of Multi-Level QAM with Post-Detection Maximal Ratio Combining Space Diversity for Digital Land-Mobile Radio Communications", IEEE Conference Proceedings Article, IEEE Transactions on Vehicular Technology, vol. 42, No. 3, Aug. 1993, XP010003610.

A. Stefanov et al., Turbo-Coded Modulation for Systems with Transmit and Receive Antenna Diversity over Block Fading Channels: System Model, Decoding Approaches, and Practical Considerations, IEEE, Dept of Electrical Engineering, IEEE journal on Selected Areas in Communications, vol. 19, No. 5, May 2001, XP010373371.

A. Bury, "Diversity Comparison of Spreading Transforms for Multicarrier Spread Spectrum Transmission", IEEE, Multicarrier and Spread Spectrum Systems of the IEEE Communications Society, IEEE Transactions on Communications, vol. 51, No. 5, pp. 774-781, May 2003.

R. Raulefs et al., "Multi User Detection and Channel Estimation with Rotated Transforms for MC-CDMA", in Proc. World Wireless Research Forum No. 9 (WWRF #9), Zurich, Switzerland, Jul. 2003.

R. Raulefs et al., "Rotated Spreading Sequences for Broadband Multicarrier-CDMA", Vehicular Technology Conference, (VTC 'F03'), Orlando, FL, USA, Oct. 2003.

* cited by examiner

US 8,369,449 B2

METHOD AND SYSTEM OF DIVERSITY TRANSMISSION OF DATA EMPLOYING M-POINT QAM MODULATION

This invention pertains to the digital communication systems and methods, and more particularly, to a method and system of diversity transmission of data.

It is well known that wireless communications channels are subject to multipath fading and Doppler effect.

Diversity transmission may be employed to mitigate the effects of channel fading. According to the basic diversity transmission method, multiple copies of transmission data are transmitted over multiple diversity channels. These diversity channels may be separated from each other in time, frequency, space, or a combination of these domains. At the receiver, a more reliable estimate of the transmitted data is obtained by combining the information available in the copies received over the multiple parallel diversity channels.

The down side of the basic diversity technique is that the bandwidth efficiency is reduced. To achieve diversity gain without a loss in transmission rate, a form of signal space diversity or lattice coding can be used. One drawback of these schemes, however, is their high computational complexity at the receiver.

A simpler full rate signal space diversity technique is the use of Code Division Multiplexing (CDM). In this method, L symbols are spread over L diversity channels using an orthogonal transform. Usually either a Hadamard or Fourier transform is used. These transforms are preferred since they can be implemented at the transmitter with little complexity using a Fast Hadamard Transform (FHT) or a Fast Fourier Transform (FFT).

However, when these signals are transmitted over the diversity channels, the difference in the fading characteristics of the diversity channels ruins the orthogonality of the codes, creating self-interference (SI) and making accurate signal detection complex. To detect the transmitted signal in the presence of SI, the optimal Maximum Likelihood (ML) detection method is to detect each bit using the Log-Likelihood Ratio (LLR). Unfortunately, the computation of the LLR for these complex signals is not practical. Alternatively, it is also possible to despread the received data symbols and then use an interference cancellation scheme that iteratively estimates the amount of self-interference and removes it from the received symbols. However, such interference cancellation methods also involve considerable computational complexity. It is also possible to implement a simple receiver using Zero Forcing (ZF) or Minimum Mean Square Error (MMSE) equalization. However, these methods do not result in good performance.

Furthermore, the CDM scheme using simple Hadamard or Fourier transforms cannot achieve a full degree of diversity. This is due to the fact that these spreading transforms result in overlapping constellation points. In other words, two different sets of data symbols spread using these codes can result in the same transmission symbol on one or more diversity channels. FIG. 1 illustrates a 256 point constellation produced by Hadamard spreading of 4 QPSK symbols over 4 diversity channels, where it can be seen that there is substantial overlap of constellation points.

A method has been proposed where QPSK modulated data symbols are rotated before spreading. The use of this method avoids overlapping of the transmit symbols, and thus, it can achieve full degree of diversity. If an optimum ML receiver is implemented, significantly better performance is obtained. FIG. 2 shows a 256 point constellation produced by rotated Hadamard spreading of 4 QPSK symbols over 4 diversity channels.

However, the unusual constellation shape shown in FIG. 2 complicates detection of these signals. Optimal ML detection of these signals requires a high degree of computational complexity in the receiver.

Accordingly, it would be desirable to provide an improved transmission method and system that provides a full degree of transmission diversity. It would be further desirable to provide a method and system of diversity transmission that facilitates the use of a low-complexity receiver architecture. It would be still further desirable to provide a low-complexity receiver for detecting a full-diversity transmission. The present invention is directed to addressing one or more of the preceding concerns.

In one aspect of the invention, a method of communicating a plurality of data bits over L diversity channels, comprises: providing a constellation set comprising a plurality (L) of M-point quadrature amplitude modulation (QAM) constellations corresponding to the L diversity channels; mapping k*L data bits to L QAM transmission symbols in the L QAM constellation sets; and transmitting the L QAM symbols, where $M=2^{k*L}$; and wherein for all combinations of k*L bits, changing a value of one of k*L data bits changes all of the L symbols.

In another aspect of the invention, a receiver is adapted to receive k*L bits transmitted over diversity channels having a plurality (L) of M-point quadrature amplitude modulation (QAM) constellations. The receiver comprises: a channel estimator adapted to output therefrom a plurality (L) of estimates $h_l$ of the channel gain for each symbol; a soft demapper adapted to receive the plurality (L) of symbols $r_l$ and the plurality (L) of channel estimates $h_l$ and outputting therefrom a plurality (k*L) of approximate log-likelihood ratios $\Lambda'_i$ for the k*L transmitted bits; a deinterleaver adapted to deinterleave the plurality of approximate log-likelihood ratios; and a decoder adapted to decode the plurality of approximate log-likelihood ratios into the k*L received bits, wherein the soft demapper calculates the approximate log-likelihood ratios $\Lambda'_i$ for each of the k*L transmitted bits, for i∈ (1, . . . , k*L), using either: (1) only the in-phase components of all of the plurality (L) of symbols $r_l$; or (2) only the quadrature components of all of the plurality (L) of symbols $r_l$.

In yet another aspect of the invention, a method of communicating a plurality of data bits, comprises: providing a constellation set comprising a plurality (L) of M-point quadrature amplitude modulation (QAM) constellations; mapping k*L data bits to L QAM transmission symbols in the L QAM constellation sets; and transmitting the L QAM symbols, where $M=2^{k*L}$; and wherein each of the k*L data bits is directly mapped into all of the L QAM symbols of the QAM constellation set.

The description to follow pertains to a new system and method of quadrature amplitude modulation (QAM) referred to herein as "Multi-QAM," and to systems and methods of transmitting and receiving data modulated using Multi-QAM. In the Multi-QAM scheme, data bits are directly mapped into multiple M-ary QAM (M-QAM) transmission symbols. Beneficially, in such a scheme L diversity channels correspond to L constellations having no overlapping points, providing full transmission diversity. Beneficially, each of the L constellations is a square M-QAM constellation.

In the discussion below, the following definitions apply:

$C^{(l)}$ is a QAM constellation for the $l^{th}$ diversity channel;

M is the number of points in each QAM constellation (M-QAM constellation);

m is a unique message to be transmitted;

$s^{(l)}_m$ is the symbol transmitted on the $l^{th}$ diversity channel representing message m;

S is the vector describing all the transmission symbols $s^{(l)}_m$; and b(i,j) is the Hamming distance between two messages i and j.

Furthermore, in the discussion to follow, we assign the following variables:

L is the number of diversity channels, and therefore also the number of transmission symbols (one transmission symbol per diversity channel), and the number of M-QAM constellations (one constellation per channel); and k is the number of data bits to be transmitted per diversity channel.

In that case:

$$M = 2^{kL}; \quad (1)$$

$$S_m = [s^{(0)}_m, \ldots, s^{(L-1)}_m]; \text{ and} \quad (2)$$

$$C^{(l)} = \{s_m^{(l)} | m = 0, \ldots, M-1\}. \quad (3)$$

Figure 1:
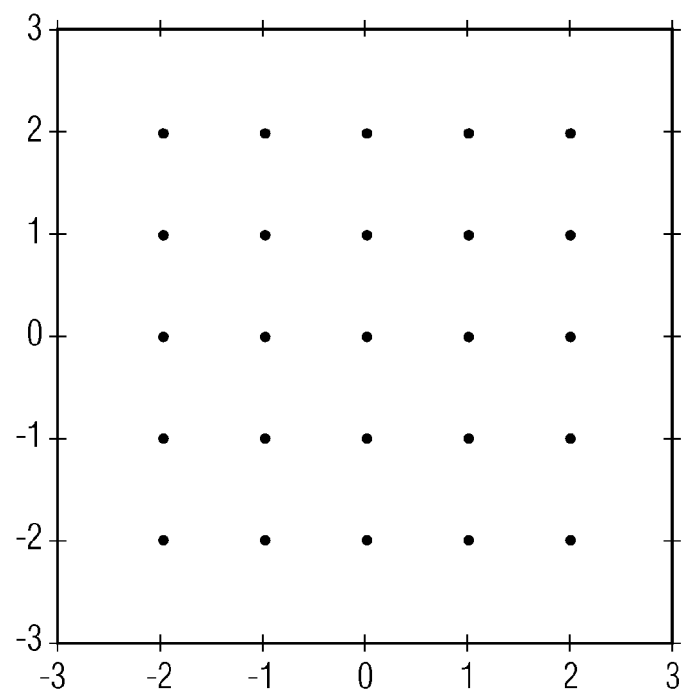
FIG. 1 shows a constellation map for a 256 point constellation produced by Hadamard spreading of 4 QPSK symbols over 4 diversity channels.
Figure 2:
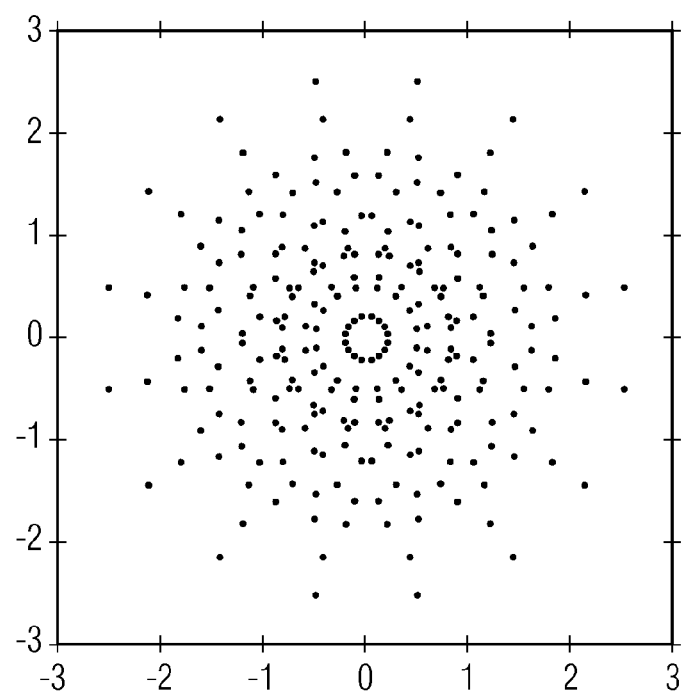
FIG. 2 shows a constellation map for a 256 point constellation produced by rotated Hadamard spreading of 4 QPSK symbols over 4 diversity channels.
Figure 3:
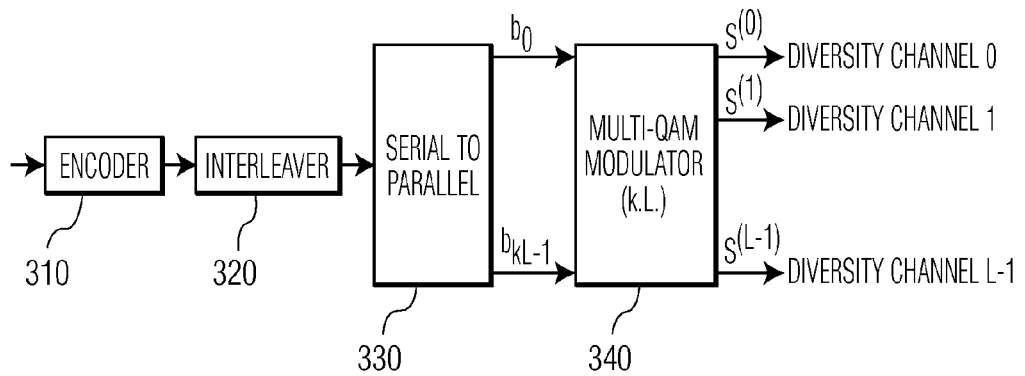
FIG. 3 shows a block diagram of a system for transmitting data over a plurality of diversity channels.

FIG. 3 shows a block diagram of a transmission system 300 for transmitting data over a plurality of diversity channels using Multi-QAM modulation. The transmission system 300 includes an encoder 310, an interleaver 320, a serial-parallel converter 330, and a Multi-QAM modulator 340.

Optionally, in alternative embodiments, the transmission system may not code and/or interleave the data, in which case encoder 310 and/or interleaver 320 may be omitted.

Encoder 310 receives "raw" data and codes it with an error-correction code to facilitate accurate data recovery at the receiver side when the transmission channel causes bit errors due to noise or interference (e.g., multipath interference). In other words, encoder 310 adds additional "redundancy" bits to the data stream according to a set algorithm, and the receiver has a priori knowledge of the coding algorithm which allows it to recover the raw data with a reduced bit error rate. A variety of error correction codes may be employed. Beneficially, encoder 310 may implement a convolutional code or a punctured convolution code (e.g., ¾ rate punctured convolutional code).

Interleaver 320 interleaves the coded data in time. That is, interleaver 320 redistributes the order of the encoded data bits according to a set pattern so that bits that are "adjacent" in the raw data stream are separated in the interleaved bit stream. Meanwhile, the receiver has a priori knowledge of the interleaving algorithm which allows it deinterleave the received data bits to their proper order in the data stream. By interleaving the data this way, the ability of the receiver to correct for data errors, particularly burst errors, is improved. The bit error rate reducing effect of encoder 310 is enhanced by its use in conjunction with interleaver 320.

Serial-parallel converter 330 receives the interleaved, encoded, serial data and outputs the bits in parallel, one parallel group of k*L data bits at a time, where L is the number of diversity channels employed by the system, and k is the number of bits to be transmitted per symbol for each diversity channel.

Optionally, the coded, interleaved data may be provided in parallel to transmission system 300. For example, the data may have already been coded and optionally interleaved, and then stored on a data storage medium. Then when it is time to transmit the data, the encoded and interleaved data may be read out from the storage medium and provided to the Multi-QAM transmission system. The data may be read out in parallel groups of k*L bits. In that case, one or more components among the coder 310, interleaver 320, and serial-parallel converter 330 may be omitted from the transmission system 300, their functions having been already equivalently performed by one or more external components.

Multi-QAM modulator 340 receives the k*L parallel data bits and generates a total of L M-QAM transmission symbols, $S_m = [s^{(0)}_m, \ldots, s^{(L-1)}_m]$, to be transmitted on the L diversity channels, with one M-QAM transmission symbol being transmitted on each diversity channel.

In particular, Multi-QAM modulator 340 directly maps the k*L data bits into all of the L M-QAM transmission symbols, each M-QAM transmission symbol belonging to one of L square M-QAM constellations corresponding to the L diversity channels, where $M = 2^{kL}$. For example, when k is two (2) and L is four (4), then (k, L) is (2, 4) and M is 256. That is, in that case each of the L diversity channels has its own 256 point square M-QAM constellation. Beneficially, the constellations do not exhibit overlapping data points. In one embodiment, Multi-QAM modulator 340 implements the M-QAM symbol generation using one or more look-up tables (e.g., one look-up table for each of the L channels).

Significantly, the Multi-QAM constellation set is designed such that changing any one of the k*L data bits will in turn change the M-QAM transmission symbols in all of the L M-QAM constellations.

Figure 4:
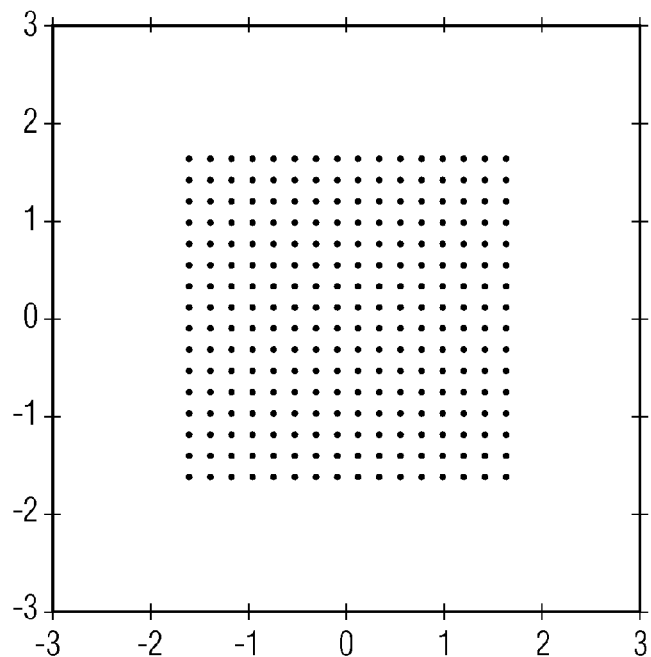
FIG. 4 shows a constellation map for a 256 point constellation produced by system employing a Multi-Quadrature Amplitude Modulation (Multi-QAM) transmission scheme.

FIG. 4 shows a constellation map for a 256 point M-QAM constellation produced by Multi-QAM modulator 340. As can be seen, advantageously none of the 256 points in the constellation of FIG. 4 overlap each other.

Beneficially, the constellation set for Multi-QAM modulator 340 is selected to be symmetrical. That is, if, for a given message m the transmission symbols are defined by a vector $S_m$, then for a message $\overline{m} = (2^{kL} - 1 - m)$ the symbols are defined by the vector $-S_m$.

Beneficially, the constellations exhibit good distance properties and establish an upper bound on the bit error rate (BER) performance of the system. To achieve these parameters within the symmetric constellation sets, beneficially a constellation set for Multi-QAM modulator 340 is chosen to minimize $\Omega_C$, where:

$$\Omega_C = \sum_{i \neq j} \frac{b(i,j)}{\prod_{l=0}^{L-1} |S_i^{(l)} - S_j^{(l)}|^2}. \quad (4)$$

Also beneficially, the in-phase (I) and quadrature (Q) components of each constellation in the constellation set use the same constellation points. This simplifies the receiver design, as discussed in further detail below.

Through an exhaustive search, the following specific cases have been identified.

When k=3, L=2, beneficially the in-phase (I) and quadrature (Q) components of the constellation set are each defined by Table 1, below.

TABLE 1

| M | 0 | 1 | 2 | 3 | 4 | 5 | 6 | 7 |
|---|---|---|---|---|---|---|---|---|
| $s^{(0)}_m$ | -7 | -5 | -1 | -3 | 3 | 1 | 5 | 7 |
| $s^{(1)}_m$ | 3 | -5 | 7 | -1 | 1 | -7 | 5 | -3 |

When k=2, L=3, beneficially the in-phase (I) and quadrature (Q) components of the constellation set are each defined by Table 2, below.

TABLE 2

| M | 0 | 1 | 2 | 3 | 4 | 5 | 6 | 7 |
|---|---|---|---|---|---|---|---|---|
| $s^{(0)}_m$ | -7 | -3 | -1 | -5 | 5 | 1 | 3 | 7 |
| $s^{(1)}_m$ | 3 | -1 | 7 | -5 | 5 | -7 | 1 | -3 |
| $s^{(2)}_m$ | 1 | 7 | -3 | -5 | 5 | 3 | -7 | -1 |

When k=4, L=2, beneficially the in-phase (I) and quadrature (Q) components of the constellation set are each defined by Table 3, below.

TABLE 3

| m | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| $s^{(0)}_m$ | -15 | -13 | -11 | -9 | -3 | -1 | -7 | -5 | 5 | 7 | 1 | 3 | 9 | 11 | 13 | 15 |
| $s^{(1)}_m$ | -1 | 11 | -7 | 5 | -3 | 9 | -13 | 15 | -15 | 13 | -9 | 3 | -5 | 7 | -11 | 1 |

When k=2, L=4, the process of finding a suitable constellation set becomes computationally difficult.

Figure 5:
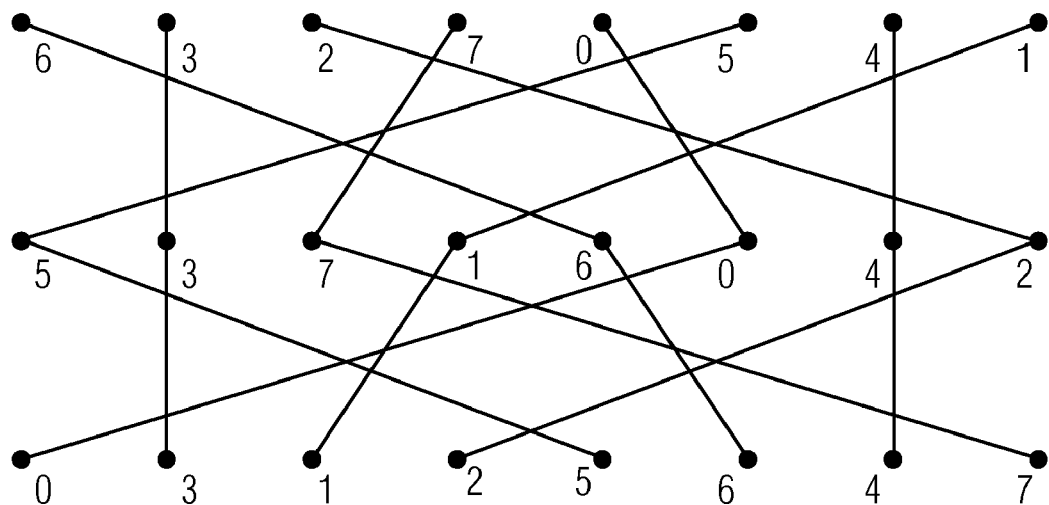
FIG. 5 shows a graphical representation of the constellation set of Table 2.

FIG. 5 shows a graphical representation of the constellation set of Table 2. Inspection of FIG. 5 reveals a significant feature of the constellation set. For example, one sees that the symbol $s_0^{(0)}$ for the constellation $C^{(0)}$ has a value of −7, and the symbol $s_0^{(1)}$ for the constellation $C^{(1)}$ has a value of 3. Meanwhile, the symbol $s_5^{(1)}$ for the constellation $C^{(1)}$ also has a value of −7, and the symbol $s_5^{(2)}$ for the constellation $C^{(2)}$ also has a value of 3. Similarly, the symbol $s_1^{(0)}$ for the constellation $C^{(0)}$ has a value of −3, and the symbol $s_1^{(1)}$ for the constellation $C^{(1)}$ has a value of −1. Meanwhile, the symbol $S_7^{(1)}$ for the constellation $C^{(1)}$ also has a value of −3, and the symbol $S_7^{(2)}$ for the constellation $C^{(2)}$ also has a value of −1.

In general, inspection of FIG. 5 reveals that the permutation to reach from any constellation, $C^{(l)}$ to the next constellation $C^{(l+1)}$ is the same for all l.

So, for the case where k=2, L=4, by concentrating on symmetrical constellation sets where the permutation to reach from any constellation, $C^{(l)}$ to the next constellation $C^{(l+1)}$ is the same for all l, and searching for a constellation set that minimizes $\Omega_C$, one finds the constellation set where the in-phase (I) and quadrature (Q) components of the constellation set are each defined by Table 4, below.

TABLE 4

| m | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| $s^{(0)}_m$ | -15 | -9 | -1 | -13 | -5 | -11 | 3 | -7 | 7 | -3 | 11 | 5 | 13 | 1 | 9 | 15 |
| $s^{(1)}_m$ | -5 | -15 | 13 | 7 | 3 | -1 | 9 | 11 | -11 | -9 | 1 | -3 | -7 | -13 | 15 | 5 |
| $s^{(2)}_m$ | 3 | -5 | -7 | -11 | 9 | 13 | 15 | 1 | -1 | -15 | -13 | -9 | 11 | 7 | 5 | -3 |
| $s^{(3)}_m$ | 9 | 3 | 11 | -1 | 15 | -7 | 5 | -13 | 13 | -5 | 7 | -15 | 1 | -11 | -3 | -9 |

Figure 6:
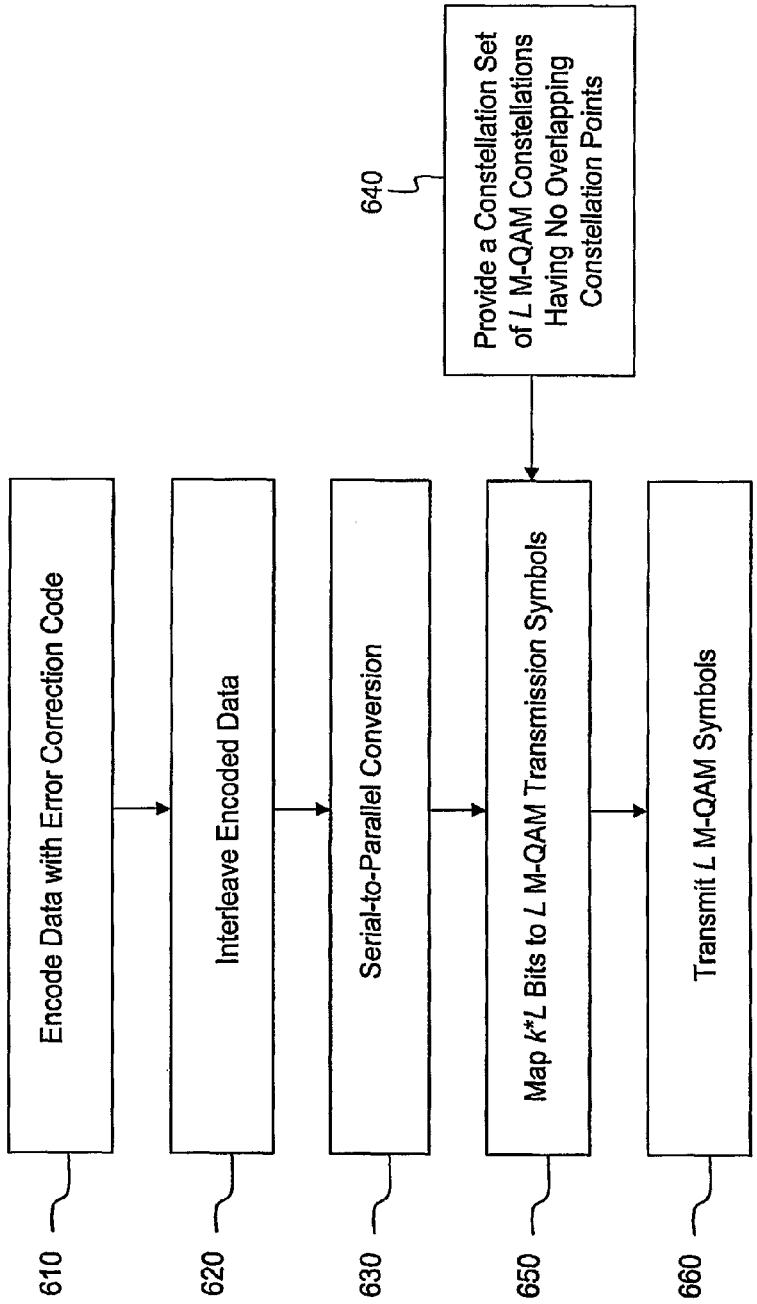
FIG. 6 is a flowchart illustrating a method of communicating a plurality of data bits.

FIG. 6 shows a flowchart of a method of communicating data using a system such as the system 300 shown in FIG. 3.

In a first step 610, "raw" data is coded with an error-correction code to facilitate accurate data recovery at the receiver side when the transmission channel causes bit errors due to noise or channel effects (e.g., multipath fading). A variety of error correction codes may be employed. Beneficially, the encoder may implement a convolutional code or a punctured convolution code (e.g., ¾ rate punctured convolutional code).

In a step 620, the coded data is interleaved.

In a step 630, the coded, interleaved data is converted from a serial data stream to a parallel set of k*L parallel data bits.

Optionally, the coded, interleaved data may be provided in parallel to the transmission system. For example, the data may have already been coded, interleaved, and stored on a data storage medium, and then when ready for transmission, it may be read out in parallel from the storage medium and provided to the Multi-QAM transmission system.

In a step 640, a Multi-QAM modulator is provided with a constellation set comprising a plurality (L) of M-point quadrature amplitude modulation (M-QAM) constellations. Beneficially, the constellations do not exhibit overlapping data points. The M-QAM constellation set may be provided in the form or one or more look-up tables.

Significantly, the M-QAM constellation set provides that for all combinations of k*L data bits received by the Multi-QAM modulator, changing any one of the k*L data bits will in turn change the M-QAM transmission symbols in all of the L M-QAM constellations.

Beneficially, the M-QAM constellations in the M-QAM constellation set exhibit good distance properties and establish an upper bound on the bit error rate (BER) performance of the system. Also beneficially, the M-QAM constellation set is selected to be symmetrical. Furthermore, beneficially the in-phase (I) and quadrature (Q) components of each M-QAM constellation in the M-QAM constellation set use the same constellation points. To achieve these parameters, beneficially an M-QAM constellation set for the Multi-QAM modulator is chosen to minimize $\Omega_C$ (equation 4). The in-phase (I) and quadrature (Q) components of the M-QAM constellation set may each correspond to any one of the constellation sets shown in Tables 1-4 above.

In a step 650, the Multi-QAM modulator maps the k*L data bits to L M-QAM transmission symbols in the L M-QAM constellation sets. Each of the k*L data bits is directly mapped into all of the L M-QAM symbols of the M-QAM constellation set.

Then, in a step 660, the L M-QAM symbols are transmitted.

At the receiver, regardless of whether hard or soft decisions are used, for optimal maximum likelihood (ML) detection of the original data bits, the Log-Likelihood Ratio (LLR) or each bit must be calculated. Assume that diversity channel l is modeled by:

$$r_l = h_l * x_l + n_l,\qquad(5)$$

where $r_l$ is the received symbol from diversity channel l, $h_l$ is the complex channel gain for diversity channel l, $x_l$ is the originally transmitted symbol for diversity channel l belonging to constellation $C^{(l)}$, and $n_l$ is the complex additive white Gaussian noise (AWGN) having variance $\sigma^2$. In that case, the LLR, $\Lambda_i$, for the $i^{th}$ transmitted bit is:

$$\Lambda_i = \frac{\sum_{m \in A_1} \exp\left(-\frac{1}{2\sigma^2} \sum_{l=0}^{L-1} |r_l - h_l * s_m^{(l)}|^2\right)}{\sum_{m \in A_0} \exp\left(-\frac{1}{2\sigma^2} \sum_{l=0}^{L-1} |r_l - h_l * s_m^{(l)}|^2\right)} \qquad(6)$$

where $i \in (1, \ldots, k*L)$, $A_o$ contains all messages where bit i=0, and $A_1$ contains all messages where bit i=1.

Unfortunately, exact calculation of equation (6) for each received bit is very complex and not suitable for a practical receiver implementation.

However, advantageously, because of properties of the M-QAM constellations used in the Multi-QAM transmission (e.g., symmetry; separation of bits on in-phase and quadrature channels; etc.), a significantly simpler demapper may be employed which provides an excellent approximation of the LLR $\Lambda_i$.

Beneficially, a receiver calculates the approximate the approximate LLR, $\Lambda'_i$, of each bit according to following formulas:

$$\Lambda'_{iR} = \sum_{l=0}^{L-1} (z_{R,l} - |h_l|s^l_{R,m0_R})^2 - \sum_{l=0}^{L-1} (z_{R,l} - |h_l|s^l_{R,m1_R})^2 \qquad(7)$$

and $$\Lambda'_{iI} = \sum_{l=0}^{L-1} (z_{I,l} - |h_l|s^l_{I,m0_I})^2 - \sum_{l=0}^{L-1} (z_{I,l} - |h_l|s^l_{I,m1_I})^2, \qquad(8)$$

where $\Lambda'_{iR}$ is the approximate log-likelihood ratio for a bit modulated using in-phase components of the QAM symbols;

where $\Lambda'_{iI}$ is the approximate log-likelihood ratio for a bit modulated using quadrature components of the QAM symbols;

where z is $$\frac{r_l h_l^*}{|h_l|},$$

where $m_{0R}$ is the message among all messages m where the bit i=0 that minimizes $$\sum_{l=0}^{L-1} (z_{R,l} - |h_l|s^l_{R,m})^2,$$

where $m_{1R}$ is the message the message among all messages m where the bit i=1 that minimizes $$\sum_{l=0}^{L-1} (z_{R,l} - |h_l|s^l_{R,m})^2,$$

where $m_{0I}$ is the message m among all messages where the bit i=0 that minimizes $$\sum_{l=0}^{L-1} (z_{I,l} - |h_l|s^l_{I,m})^2,$$

where $m_{1I}$ is the message the message m among all messages where the bit i=1 that minimizes $$\sum_{l=0}^{L-1} (z_{I,l} - |h_l|s^l_{I,m})^2,$$

where $S^l_{R,m}$ is the in-phase component of a symbol transmitted over the $l^{th}$ diversity channel for message m, and where $S^l_{I,m}$ is the quadrature component of a symbol transmitted over the $l^{th}$ diversity channel for message m.

Figure 7:
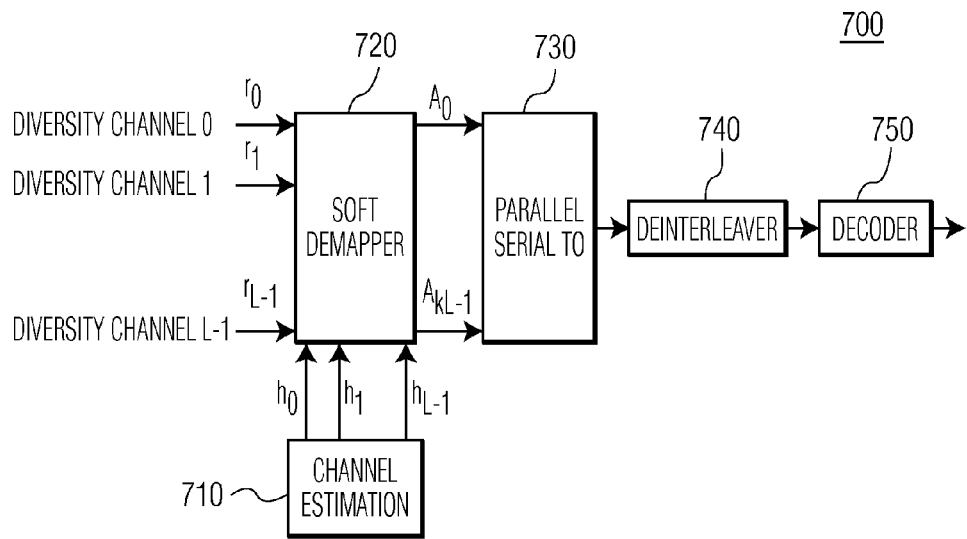
FIG. 7 shows a block diagram of a receiver for receiving data transmitted over a plurality of diversity channels.

FIG. 7 shows a block diagram of a receiver 700 for receiving data transmitted over a plurality of diversity channels using Multi-QAM. Receiver 700 comprises channel estimator 710, soft demapper 720, parallel-to-serial converter 730, deinterleaver 740, and decoder 750.

Optionally, in alternative embodiments, the transmitted data may not be coded and/or interleaved, in which case deinterleaver 740 and/or decoder 750 may be omitted.

Channel estimator 710 outputs a plurality (L) of estimates $h_l$ of the complex channel gain for the diversity channel l through a corresponding M-QAM symbol $r_l$ was received. Any of a variety of known channel estimator algorithms may be employed. For example, the channel estimator 710 may estimate the channel from a received set of training symbols which are known a priori to receiver 700. Optionally, it is possible that channel estimator 710 receives a plurality (L) of M-QAM symbols $r_l$ and estimates the channel characteristics therefrom.

Soft demapper 720 receives the plurality (L) of symbols $r_l$ and the plurality (L) of channel estimates $h_l$ and outputs therefrom a plurality (k*L) of approximate log-likelihood ratios $\Lambda'_i$ for the k*L transmitted bits that produced the L received M-QAM symbols $r_l$. Soft demapper 720 calculates the approximate log-likelihood ratios for each of the k*L transmitted bits, for i∈(1, . . . , k*L), using either: (1) only the in-phase components of all of the plurality (L) of symbols $r_j$; or (2) only the quadrature components of all of the plurality (L) of symbols $r_j$. Beneficially, the soft demapper 720 calculates the approximate log-likelihood ratios $\Lambda'_i$ according to equations (7) and (8) above.

Parallel-to-serial converter 730 receives the plurality (k*L) of approximate log-likelihood ratios $\Lambda'_i$ for the k*L transmitted bits in parallel, and converts them to a serial data stream of approximate log-likelihood ratios, $\Lambda'_i$. Optionally, soft demapper 720 may be designed in such a way that it automatically outputs the approximate log-likelihood ratios $\Lambda'_i$ as a plurality (k*L) of parallel outputs, in which case parallel-to-serial converter 730 may be omitted.

Deinterleaver 740 receives the serial data stream of approximate log-likelihood ratios $\Lambda'_i$ and deinterleaves the approximate log-likelihood ratios $\Lambda'_i$ to correspond to the original order of the data before it was interleaved on the transmit side.

Decoder 750 receives the deinterleaved log-likelihood ratios $\Lambda'_i$ and applies an error correction decoding algorithm to detect the received "raw" data bits. Beneficially, decoder 750 may decode the data using a Viterbi type decoder. Beneficially, decoder 750 uses "soft" decision decoding of the approximate log-likelihood ratios $\Lambda'_i$.

Figure 8:
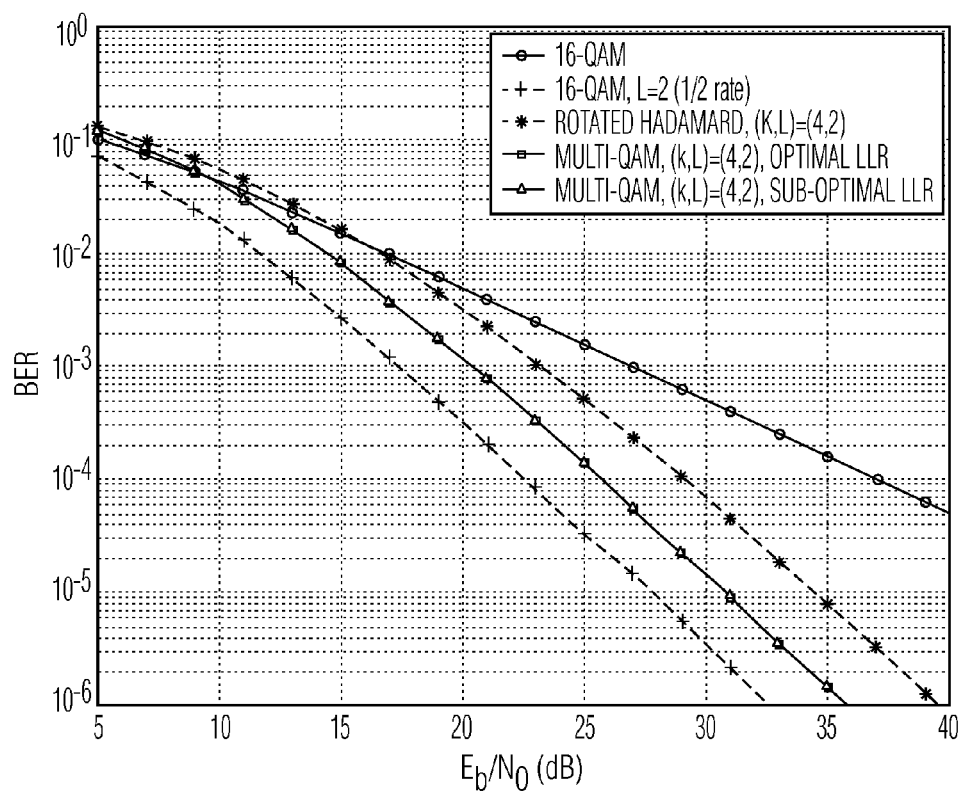
FIG. 8 shows the bit error rate (BER) performance of a number of different schemes for transmitting uncoded data over two diversity channels, with four bits per channel.

FIG. 8 shows the bit error rate (BER) performance of a number of different schemes for transmitting uncoded data over two diversity channels, with four bits per channel. In particular, FIG. 8 depicts the uncoded performance of the Multi-QAM scheme with (k,L)=(4, 2) and compares it to the BER performance of 16-QAM without diversity, 16-QAM modulation with diversity L=2 (½ rate), and rotated Hadamard spreading, where 16-PSK symbols have been used before spreading to allow the transmission of k=4 bits per diversity channel. The performance of the Multi-QAM modulation is given both using an optimal demapper of equation (6), and the approximation provided in equations (7) and (8). We observe that the approximations used to simplify the demapper 720 do not result in noticeable loss in performance. By comparing the slope of the BER curves for Multi-QAM and rotated Hadamard spreading, to that of the 16-QAM with simple diversity, we can see that both schemes achieve full diversity. Furthermore, we observe that Multi-QAM performs better than the rotated Hadamard.

Figure 9:
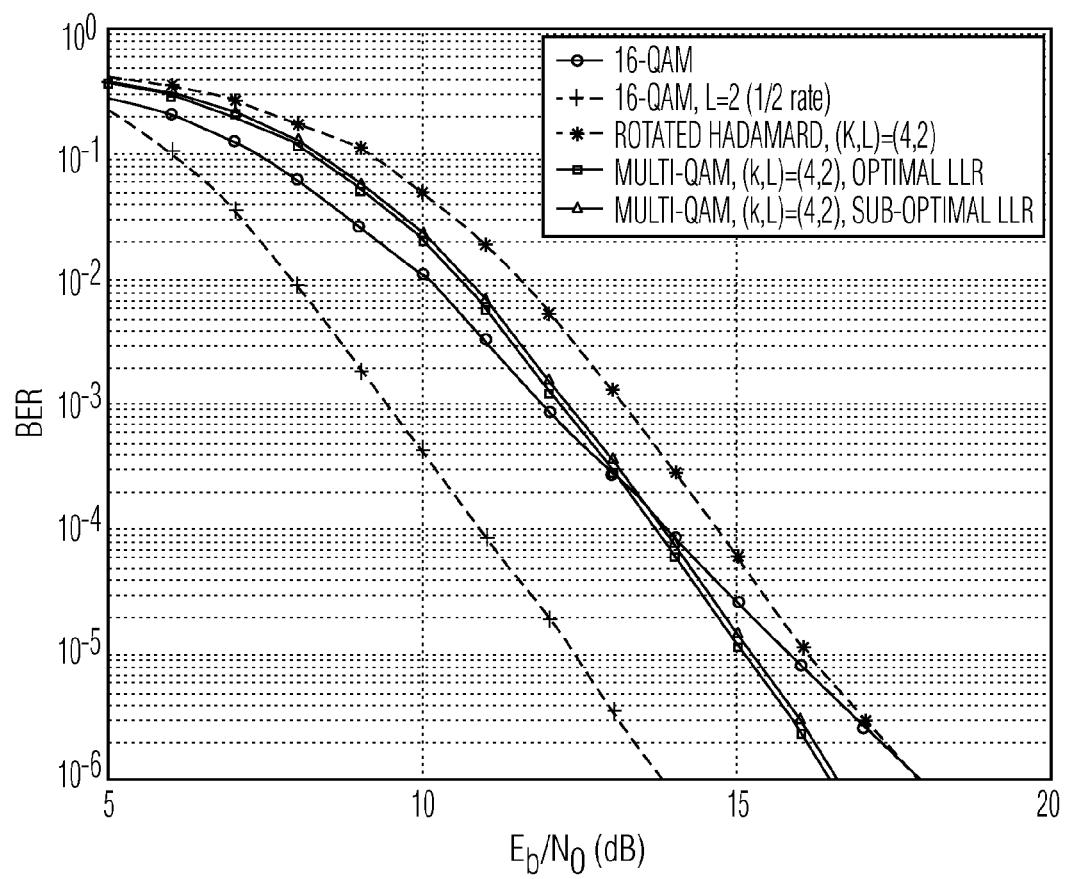
FIG. 9 shows the bit error rate (BER) performance of a number of different schemes for transmitting coded data over two diversity channels, with four bits per channel.

FIG. 9 shows the bit error rate (BER) performance of the same modulation schemes shown in FIG. 8 for transmitting coded data over two diversity channels, with four bits per channel, where an industry standard ¾ rate punctured convolutional code is used. A block interleaver of sufficient length to decorrelate channel errors has been employed. At the receiver a Viterbi algorithm uses soft decisions to decode the data bits. We can see that at a BER of $10^{-6}$, Multi-QAM shows a gain of approximately 1.5 dB compared to the 16-QAM.

Figure 10:
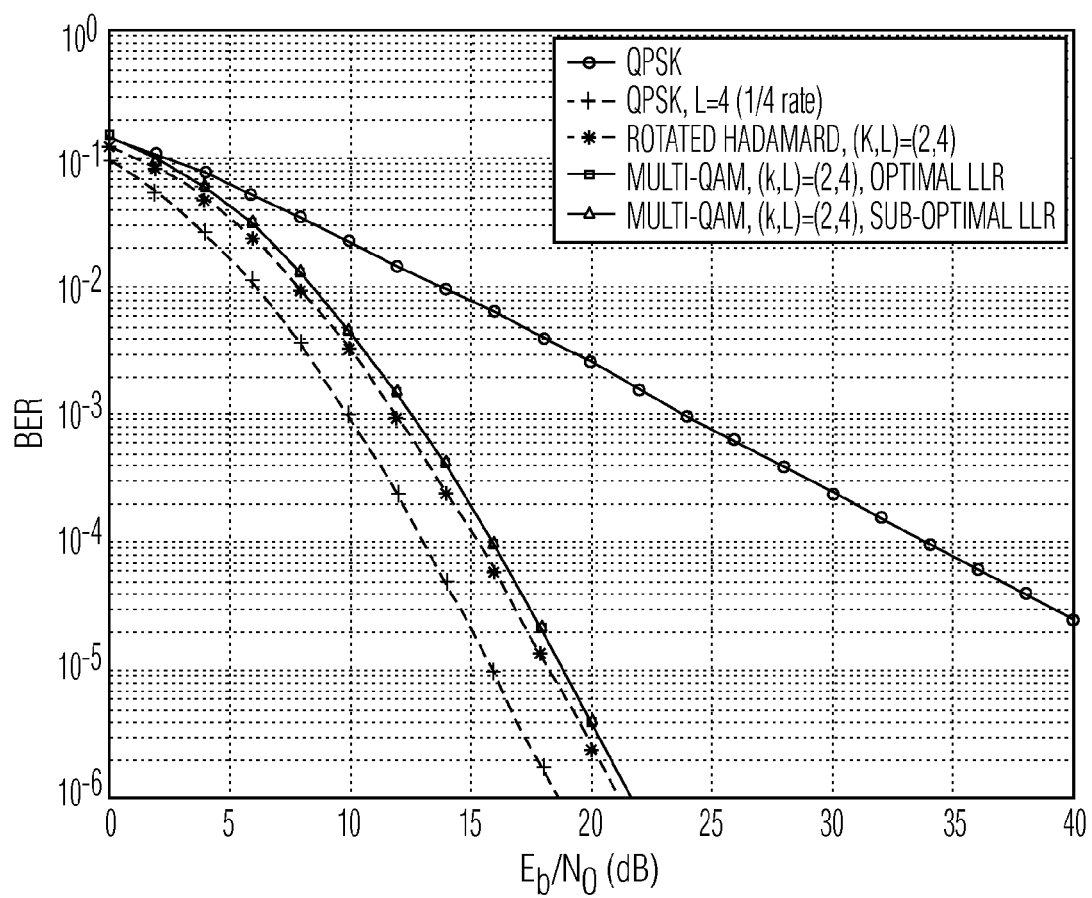
FIG. 10 shows the bit error rate (BER) performance of a number of different schemes for transmitting uncoded data over four diversity channels, with two bits per channel.
Figure 11:
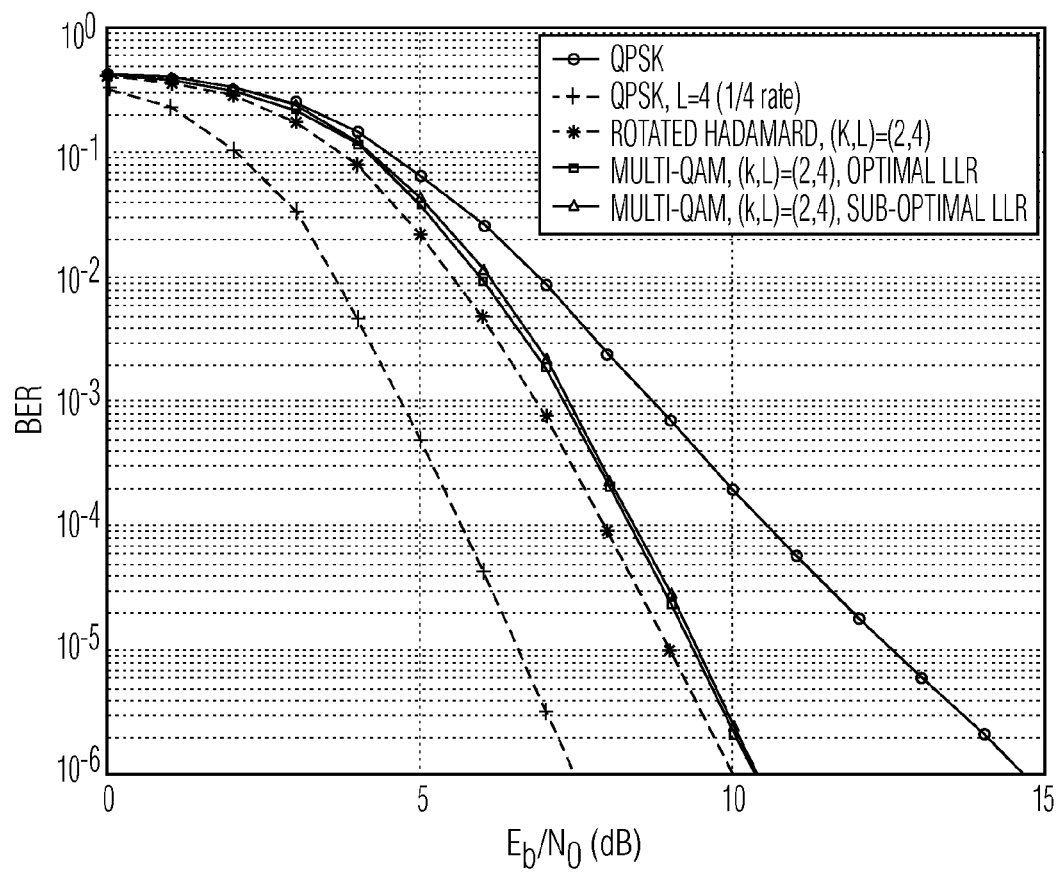
FIG. 11 shows the bit error rate (BER) performance of a number of different schemes for transmitting coded data over four diversity channels, with two bits per channel.

FIGS. 10 and 11 show the simulated uncoded and coded BER results for Multi-QAM modulation with (k,L)=(2, 4). These results are compared with those of QPSK modulation without diversity, QPSK modulation with diversity L=4 (¼ rate), and rotated Hadamard spreading. Once again we observe that full degree of diversity is achieved. We also observe that a BER of 10−6, the proposed Multi-QAM performs 4.2 dB better compared to the QPSK modulation. However, it performs 0.5 dB worse than the rotated Hadamard. On the other hand, considering that the proposed scheme can be implemented at significantly lowered complexity, it still shows desirable performance.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of communicating a plurality of data bits over L diversity channels, comprising:
   providing a constellation set comprising a plurality (L) of M-point quadrature amplitude modulation (QAM) constellations corresponding to the L diversity channels;
   mapping k*L data bits to L QAM transmission symbols in the L QAM constellation sets; and
   transmitting the L QAM symbols over said respective L diversity channels,
   where $M=2^{k*L}$; and
   wherein for all combinations of k*L bits, changing a value of one of k*L data bits changes all of the L symbols.

2. The method of claim 1, wherein the constellation set minimizes $\Omega_C$, where $$\Omega_C = \sum_{i \neq j} \frac{b(i,j)}{\prod_{l=0}^{L-1} |S_i^{(l)} - S_j^{(l)}|^2}.$$

3. The method of claim 1, wherein, when for any message m the symbols are defined by a vector $S_m$, then for a message $\overline{m}=(2^{kL}-1-m)$, the symbols are defined by the vector $-S_m$.

4. The method of claim 1, where k=3, L=2, and where the in-phase (I) and quadrature (Q) components of the constellation set are each defined by the following table:

| m | 0 | 1 | 2 | 3 | 4 | 5 | 6 | 7 |
|---|---|---|---|---|---|---|---|---|
| $s^{(0)}_m$ | −7 | −5 | −1 | −3 | 3 | 1 | 5 | 7 |
| $s^{(1)}_m$ | 3 | −5 | 7 | −1 | 1 | −7 | 5 | −3. |

5. The method of claim 1, where k=2, L=3, and where the in-phase (I) and quadrature (Q) components of the constellation set are each defined by the following table:

| m | 0 | 1 | 2 | 3 | 4 | 5 | 6 | 7 |
|---|---|---|---|---|---|---|---|---|
| $s^{(0)}_m$ | −7 | −3 | −1 | −5 | 5 | 1 | 3 | 7 |
| $s^{(1)}_m$ | 3 | −1 | 7 | −5 | 5 | −7 | 1 | −3 |
| $s^{(2)}_m$ | 1 | 7 | −3 | −5 | 5 | 3 | −7 | −1. |

6. The method of claim 1, where k=4, L=2, and where the in-phase (I) and quadrature (Q) components of the constellation set are each defined by the following table:

| m | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $s^{(0)}_m$ | −15 | −13 | −11 | −9 | −3 | −1 | −7 | −5 | 5 | 7 | 1 | 3 | 9 | 11 | 13 | 15 |
| $s^{(1)}_m$ | −1 | 11 | −7 | 5 | −3 | 9 | −13 | 15 | −15 | 13 | −9 | 3 | −5 | 7 | −11 | 1. |

7. The method of claim 1, where k=2, L=4, and where the in-phase (I) and quadrature (Q) components of the constellation set are each defined by the following table:

| m | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $s^{(0)}_m$ | −15 | −9 | −1 | −13 | −5 | −11 | 3 | −7 | 7 | −3 | 11 | 5 | 13 | 1 | 9 | 15 |
| $s^{(1)}_m$ | −5 | −15 | 13 | 7 | 3 | −1 | 9 | 11 | −11 | −9 | 1 | −3 | −7 | −13 | 15 | 5 |
| $s^{(2)}_m$ | 3 | −5 | −7 | −11 | 9 | 13 | 15 | 1 | −1 | −15 | −13 | −9 | 11 | 7 | 5 | −3 |
| $s^{(3)}_m$ | 9 | 3 | 11 | −1 | 15 | −7 | 5 | −13 | 13 | −5 | 7 | −15 | 1 | −11 | −3 | −9. |

8. A receiver for receiving k*L bits transmitted over diversity channels comprising a plurality (L) of M-point quadrature amplitude modulation (QAM) constellations, the receiver comprising:
 a channel estimator adapted to output a plurality (L) of estimates $h_l$ of the channel gain for each symbol;
 a soft demapper adapted to receive the plurality (L) of symbols $r_l$ and the plurality (L) of channel estimates $h_l$ and to output therefrom a plurality (k*L) of approximate log-likelihood ratios $\Lambda_i'$ for the k*L transmitted bits;
 a deinterleaver adapted to deinterleave the plurality of approximate log-likelihood ratios; and
 a decoder adapted to decode the plurality of log-likelihood ratios into the k*L received bits,
 wherein the soft demapper calculates the approximate log-likelihood ratios $\Lambda_i'$ for each of the k*L transmitted bits, for i∈(1, . . . , k*L), using either: (1) only the in-phase components of all of the plurality (L) of symbols $r_l$; or (2) only the quadrature components of all of the plurality (L) of symbols $r_l$.

9. The receiver of claim 8, wherein the soft demapper demaps the symbols $r_l$ into the log-likelihood ratios $\kappa_i'$ according to the formulas:

$$\Lambda'_{iR} = \sum_{l=0}^{L-1}(z_{R,l} - |h_l|s^l_{R,m0_R})^2 - \sum_{l=0}^{L-1}(z_{R,l} - |h_l|s^l_{R,m1_R})^2$$

and $$\Lambda'_{iI} = \sum_{l=0}^{L-1}(z_{I,l} - |h_l|s^l_{I,m0_I})^2 - \sum_{l=0}^{L-1}(z_{I,l} - |h_l|s^l_{I,m1_I})^2,$$

where $\Lambda_{iR}'$ is an approximate log-likelihood ratio for a bit modulated using in-phase components of the QAM symbols;
where $\Lambda_{iI}'$, is an approximate log-likelihood ratio for a bit modulated using quadrature components of the QAM symbols;
where z is $$\frac{r_l h_l^*}{|h_l|},$$

where $m_{0R}$ is the message among all messages m where the bit i=0 that minimizes $$\sum_{l=0}^{L-1}(z_{R,l} - |h_l|s^l_{R,m})^2,$$

where $m_{1R}$ is the message the message among all messages m where the bit i=1 that minimizes $$\sum_{l=0}^{L-1}(z_{R,l} - |h_l|s^l_{R,m})^2,$$

where $m_{0I}$ is the message m among all messages where the bit i=0 that minimizes $$\sum_{l=0}^{L-1}(z_{I,l} - |h_l|s^l_{I,m})^2,$$

where $m_{1I}$ is the message the message m among all messages where the bit i=1 that minimizes $$\sum_{l=0}^{L-1}(z_{I,l} - |h_l|s^l_{I,m})^2,$$

where $S^l_{R,m}$ is the in-phase component of a symbol transmitted over the $l^{th}$ diversity channel for message m, and
where $S^l_{I,m}$ is the quadrature component of a symbol transmitted over the $l^{th}$ diversity channel for message m.

10. The receiver of claim 8, further comprising a parallel-to-serial converter adapted to receive in parallel the plurality (k*L) of approximate log-likelihood ratios $\Lambda_i'$ from the soft demapper and to output a serial data stream comprising the plurality (k*L) of approximate log-likelihood ratios $\Lambda_i'$.

11. The receiver of claim 8, where the decoder performs a Viterbi error correction algorithm using soft decisions.

12. A method of communicating a plurality of data bits over L diversity channels, comprising:
 providing a constellation set comprising a plurality (L) of M-point quadrature amplitude modulation (QAM) constellations corresponding to the L diversity channels;
 mapping k*L data bits to L QAM transmission symbols in the L QAM constellation sets; and
 transmitting the L QAM symbols over said respective L diversity channels,
 where $M=2^{k*L}$; and
 wherein each of the k*L data bits is directly mapped into all of the L QAM symbols of the QAM constellation set.

13. The method of claim 12, further comprising:
 encoding "raw" data with an error-correction code;
 interleaving the encoded data; and
 converting the coded, interleaved data from a serial data stream to a parallel set of k*L parallel data bits.

14. The method of claim 12, wherein the constellation set minimizes $\Omega_C$, where $$\Omega_C = \sum_{i \neq j} \frac{b(i,j)}{\prod_{l=0}^{L-1}|S_i^{(l)} - S_j^{(l)}|^2}.$$

15. The method of claim 12, wherein, when for any message m the symbols are defined by a vector $S_m$, then for a message $\overline{m}=(2^{kL}-1-m)$, the symbols are defined by the vector $-S_m$.

16. The method of claim 12, where k=3, L=2, and where the in-phase (I) and quadrature (Q) components of the constellation set are each defined by the following table:

| m | 0 | 1 | 2 | 3 | 4 | 5 | 6 | 7 |
|---|---|---|---|---|---|---|---|---|
| $s^{(0)}_m$ | −7 | −5 | −1 | −3 | 3 | 1 | 5 | 7 |
| $s^{(1)}_m$ | 3 | −5 | 7 | −1 | 1 | −7 | 5 | −3. |

17. The method of claim 12, where k=2, L=3, and where the in-phase (I) and quadrature (Q) components of the constellation set are each defined by the following table:

| m | 0 | 1 | 2 | 3 | 4 | 5 | 6 | 7 |
|---|---|---|---|---|---|---|---|---|
| $s^{(0)}_m$ | −7 | −3 | −1 | −5 | 5 | 1 | 3 | 7 |
| $s^{(1)}_m$ | 3 | −1 | 7 | −5 | 5 | −7 | 1 | −3 |
| $s^{(2)}_m$ | 1 | 7 | −3 | −5 | 5 | 3 | −7 | −1. |

18. The method of claim 12, where k=4, L=2, and where the in-phase (I) and quadrature (Q) components of the constellation set are each defined by the following table:

| m | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $s^{(0)}_m$ | −15 | −13 | −11 | −9 | −3 | −1 | −7 | −5 | 5 | 7 | 1 | 3 | 9 | 11 | 13 | 15 |
| $s^{(1)}_m$ | −1 | 11 | −7 | 5 | −3 | 9 | −13 | 15 | −15 | 13 | −9 | 3 | −5 | 7 | −11 | 1. |

19. The method of claim 12, where k=2, L=4, and where the in-phase (I) and quadrature (Q) components of the constellation set are each defined by the following table:

| m | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $s^{(0)}_m$ | −15 | −9 | −1 | −13 | −5 | −11 | 3 | −7 | 7 | −3 | 11 | 5 | 13 | 1 | 9 | 15 |
| $s^{(1)}_m$ | −5 | −15 | 13 | 7 | 3 | −1 | 9 | 11 | −11 | −9 | 1 | −3 | −7 | −13 | 15 | 5 |
| $s^{(2)}_m$ | 3 | −5 | −7 | −11 | 9 | 13 | 15 | 1 | −1 | −15 | −13 | −9 | 11 | 7 | 5 | −3 |
| $s^{(3)}_m$ | 9 | 3 | 11 | −1 | 15 | −7 | 5 | −13 | 13 | −5 | 7 | −15 | 1 | −11 | −3 | −9. |

\* \* \* \* \*